US012487592B2

(12) United States Patent
Xu et al.

(10) Patent No.: US 12,487,592 B2
(45) Date of Patent: Dec. 2, 2025

(54) DEVICE OPERATION MANAGEMENT METHOD, SYSTEM, AND MEDIUM BASED ON DEVICE HEALTH DEGREE

(71) Applicant: INSPUR GENERSOFT CO., LTD., Jinan (CN)

(72) Inventors: Tongming Xu, Jinan (CN); Haiyang Lu, Jinan (CN); Junli Xue, Jinan (CN); Zhaoyang Yu, Jinan (CN); Siyuan Wang, Jinan (CN); Huaijin Gao, Jinan (CN); Ziyong Liu, Jinan (CN); Bozhao Li, Jinan (CN)

(73) Assignee: INSPUR GENERSOFT CO., LTD., Jinan (CN)

( * ) Notice: Subject to any disclaimer, the term of this patent is extended or adjusted under 35 U.S.C. 154(b) by 0 days.

(21) Appl. No.: 18/666,891

(22) Filed: May 17, 2024

(65) Prior Publication Data

US 2024/0302833 A1 Sep. 12, 2024

Related U.S. Application Data

(63) Continuation of application No. PCT/CN2023/107475, filed on Jul. 14, 2023.

(30) Foreign Application Priority Data

Feb. 6, 2023 (CN) .......................... 202310063781.8

(51) Int. Cl.
 G05B 23/02 (2006.01)
(52) U.S. Cl.
 CPC ................. G05B 23/0283 (2013.01)
(58) Field of Classification Search
 CPC .................................................. G05B 23/0283
 See application file for complete search history.

(56) References Cited

FOREIGN PATENT DOCUMENTS

CN 105527112 A 4/2016
CN 107358347 A * 11/2017
(Continued)

OTHER PUBLICATIONS

Chang et al., Equipment cluster health state evaluation method based on industrial big data, CN107358347A, 2017, English translation downloaded from Google Patents. (Year: 2017).*

(Continued)

Primary Examiner — Arleen M Vazquez
Assistant Examiner — Lyudmila Zaykova-Feldman
(74) Attorney, Agent, or Firm — Bayramoglu Law Offices LLC

(57) ABSTRACT

A device operation management method, system, and medium based on a device health degree are provided. The method includes: constructing a health degree evaluation model; collecting running values corresponding to a plurality of running status parameters in real time, and calculating a maintenance feature health degree corresponding to a maintenance component and a key feature health degree corresponding to a key and important component; determining a device health degree corresponding to a device; determining a health degree grade matching with the device health degree, and determining whether a running status corresponding to the device is healthy or not according to the health degree grade; and determining, in a case that the running status is not healthy, an attenuation interval where the maintenance component and the key and important component are located correspondingly, so as to take corresponding management strategies for the maintenance component or the key and important component.

7 Claims, 3 Drawing Sheets

(56) References Cited

FOREIGN PATENT DOCUMENTS

| | | | | |
|---|---|---|---|---|
| CN | 111812427 | A | 10/2020 | |
| CN | 111553590 | B * | 9/2021 | .............. G01S 7/40 |
| CN | 115455735 | A | 12/2022 | |
| CN | 115795922 | A | 3/2023 | |
| KR | 20230007013 | A | 1/2023 | |
| WO | 2021218003 | A1 | 11/2021 | |

OTHER PUBLICATIONS

Lu et al., A radar embedded health management system, CN111553590B, 2020, English Translation downloaded from Espacenet (Year: 2020).*

Wei Jiang, et al., A feature-level degradation measurement method for composite health index construction and trend prediction modeling, Measurement, 2023, pp. 1-20, vol. 206, 112324.

Zhao Li-Qin, et al., Assessment Method of Equipment Health State Based on Dynamic Weight, Computer Systems & Applications, 2020, pp. 198-204, vol. 29 No. 9.

* cited by examiner

DEVICE OPERATION MANAGEMENT METHOD, SYSTEM, AND MEDIUM BASED ON DEVICE HEALTH DEGREE

CROSS REFERENCE TO THE RELATED APPLICATIONS

This application is a continuation application of International Application No. PCT/CN2023/107475, filed on Jul. 14, 2023, which is based upon and claims priority to Chinese Patent Application No. 202310063781.8, filed on Feb. 6, 2023, the entire contents of which are incorporated herein by reference.

TECHNICAL FIELD

The present application relates to the technical field of data processing methods based on management purposes, in particular to a device operation management method, system, and medium based on a device health degree.

BACKGROUND

Devices, such as production devices and electronic devices, are widely applied to production and daily life. However, with the prolongation of device running time, it is very difficult to maintain good running status of the devices. Therefore, how to ensure the safe operation of the devices is an important prerequisite for improving production safety.

A device health degree is an evaluation indicator that represents device health monitoring results. By collecting device running data in real time and analyzing the running data to determine the health status of the devices, and device abnormalities can be found in time and managed, thereby improving the device operation safety. At present, infrastructure for data collection, transmission, and networks has been basically mature, but in a data analysis stage, evaluation results of the health degree often vary greatly due to different evaluation methods used. Currently, most commonly used evaluation methods focus on the entire service life of a device, which are comprehensive-characteristic-oriented health degree evaluation that does not take into account the different attenuation characteristics of each component in the device, resulting in macroscopic evaluation results and possible errors.

SUMMARY

In order to solve the above problems, the present application provides a device operation management method based on a device health degree, including:
  determining a plurality of running status parameters of a device as well as critical ranges and preset values corresponding to the plurality of running status parameters respectively to construct a health degree evaluation model, wherein the plurality of running status parameters include at least one maintenance state parameter used for representing a health degree of a maintenance component and at least one key state parameter used for representing a health degree of a key and important component;
  collecting running values corresponding to the plurality of running status parameters in real time in a running process of the device, and calculating a maintenance feature health degree corresponding to the maintenance component and a key feature health degree corresponding to the key and important component respectively, according to the running values, the critical ranges, and the preset values through the health degree evaluation model;
  determining a device health degree corresponding to the device according to the maintenance feature health degree and the key feature health degree;
  determining a health degree grade matching with the device health degree from a plurality of preset health degree grades, and determining whether an running status corresponding to the device is healthy or not according to the health degree grade; and
  determining, in a case that the running status is not healthy, an attenuation interval where the maintenance component and the key and important component are located correspondingly according to the maintenance feature health degree and the key feature health degree, so as to take corresponding management strategies for the maintenance component or the key and important component according to the attenuation interval.

In an implementation of the present application, determining the device health degree corresponding to the device according to the maintenance feature health degree and the key feature health degree, specifically includes:
  determining a working condition interval where the device is located, and determining feature weights corresponding to the plurality of running status parameters respectively according to the working condition interval, wherein the feature weights include a first feature weight corresponding to the maintenance state parameter and a second feature weight corresponding to the key state parameter; and
  performing weighted summation on the maintenance feature health degree and the key feature health degree according to the first feature weight and the second feature weight to obtain the device health degree corresponding to the device.

In an implementation of the present application, determining the attenuation interval where the maintenance component and the key and important component are located correspondingly according to the maintenance feature health degree and the key feature health degree, so as to take the corresponding management strategies for the maintenance component or the key and important component according to the attenuation interval, specifically includes:
  determining, according to the maintenance feature health degree, a maintenance attenuation interval where the maintenance component is located and an attenuation period corresponding to the maintenance attenuation interval, wherein all maintenance feature health degrees within the maintenance attenuation interval are not lower than a preset health degree lower limit value;
  maintaining the maintenance component periodically according to the attenuation period;
  determining a key attenuation interval where the key and important component is located according to the key feature health degree, wherein the attenuation interval includes a running-in interval, a normal attenuation interval, and a fast attenuation interval, and a key and important component performance inflection point exists between the normal attenuation interval and the fast attenuation interval; and
  taking the corresponding management strategies for the key and important component when the key feature health degree does not reach the key and important component performance inflection point.

In an implementation of the present application, prior to performing weighted summation on the maintenance feature health degree and the key feature health degree according to the first feature weight and the second feature weight, the method further includes:
  comparing a running value corresponding to each running status parameter with an early warning value corresponding to the running status parameter to determine running status corresponding to the maintenance state parameter and the key state parameter respectively, wherein the running status include a normal state and an abnormal state; and
  determining a positive compensation coefficient of the abnormal state and a negative compensation coefficient corresponding to the normal state respectively, and compensating the first feature weight and the second feature weight according to the positive compensation coefficient or the negative compensation coefficient to obtain a compensated first feature weight and a compensated second feature weight.

In an implementation of the present application, determining the positive compensation coefficient of the abnormal state and the negative compensation coefficient corresponding to the normal state respectively, specifically includes:
  determining a first weight sum of feature weights corresponding to the running status parameters in the abnormal state and a second weight sum of features corresponding to the running status parameters in the abnormal state; and
  determining the positive compensation coefficient of the abnormal state according to the first weight sum, a preset weight balance value, and the first feature weight, and determining the negative compensation coefficient of the normal state according to the second weight sum, the weight balance value, and the second feature weight.

In an implementation of the present application, a sum of the first feature weight and the second feature weight is the weight balance value.

In an implementation of the present application, calculating the maintenance feature health degree corresponding to the maintenance component and the key feature health degree corresponding to the key and important component respectively according to the running values, the critical ranges, and the preset values through the preset health degree evaluation model, specifically includes:
  determining a critical lower limit value and a critical upper limit value in each critical range, and comparing the running values with the critical ranges and the preset values respectively to determine a range of the running values, wherein the range includes a first range, a second range, and a third range;
  determining, in a case that the range is the first range, the maintenance feature health degree corresponding to the maintenance component and the key feature health degree corresponding to the key and important component respectively according to the running values, the preset values, and the critical lower limit values through the health degree evaluation model;
  determining, in a case that the range is the second range, the maintenance feature health degree corresponding to the maintenance component and the key feature health degree corresponding to the key and important component respectively according to the running values, the preset values, and the critical upper limit values; and
  determining, in a case that the range is the third range, that the maintenance feature health degree corresponding to the maintenance component and the key feature health degree corresponding to the key and important component are both specified values.

In an implementation of the present application, determining the maintenance feature health degree corresponding to the maintenance component and the key feature health degree corresponding to the key and important component respectively according to the running values, the preset values, and the critical lower limit values, specifically includes:
  for the plurality of running status parameters, obtaining the maintenance feature health degree corresponding to the maintenance component and the key feature health degree corresponding to the key and important component by solving a quotient of a first difference value obtained by subtraction of the running values and the critical lower limit values and a second difference value obtained by subtraction of the preset values and the critical lower limit values; and
  determining the maintenance feature health degree corresponding to the maintenance component and the key feature health degree corresponding to the key and important component respectively according to the running values, the preset values, and the critical upper limit values, specifically includes:
  for the plurality of running status parameters, obtaining the maintenance feature health degree corresponding to the maintenance component and the key feature health degree corresponding to the key and important component by solving a quotient of a third difference value obtained by subtraction of the critical upper limit values and the running values and a fourth difference value obtained by subtraction of the critical upper limit values and the preset values.

A device operation management system based on a device health degree includes:
  a model construction module, configured to determine a plurality of running status parameters of a device as well as critical ranges and preset values corresponding to the plurality of running status parameters respectively to construct a health degree evaluation model, wherein the plurality of running status parameters include at least one maintenance state parameter used for representing a health degree of a maintenance component and at least one key state parameter used for representing a health degree of a key and important component;
  a calculating module, configured to collect running values corresponding to the plurality of running status parameters in real time in a running process of the device, and calculate a maintenance feature health degree corresponding to the maintenance component and a key feature health degree corresponding to the key and important component respectively according to the running values, the critical ranges, and the preset values through the health degree evaluation model;
  a device health degree determining module, configured to determine a device health degree corresponding to the device according to the maintenance feature health degree and the key feature health degree;
  a running status evaluating module, configured to determine a health degree grade matching with the device health degree from a plurality of preset health degree grades, and determine whether a running status corresponding to the device is healthy or not according to the health degree grade; and a management module, configured to determine, in a case that the running status is not healthy, an attenuation interval where the maintenance component and the key and important component are located correspondingly according to the maintenance feature health degree and the key feature health degree, so as to take corresponding management strategies for the maintenance component or the key and important component according to the attenuation interval.

An embodiment of the present application provides a non-volatile computer storage medium, storing computer-executable instructions, wherein the computer-executable instructions are set for:

determining a plurality of running status parameters of a device as well as critical ranges and preset values corresponding to the plurality of running status parameters respectively to construct a health degree evaluation model, wherein the plurality of running status parameters include at least one maintenance state parameter used for representing a health degree of a maintenance component and at least one key state parameter used for representing a health degree of a key and important component;

collecting running values corresponding to the plurality of running status parameters in real time in a running process of the device, and calculating a maintenance feature health degree corresponding to the maintenance component and a key feature health degree corresponding to the key and important component respectively according to the running values, the critical ranges, and the preset values through the health degree evaluation model;

determining a device health degree corresponding to the device according to the maintenance feature health degree and the key feature health degree;

determining a health degree grade matching with the device health degree from a plurality of preset health degree grades, and determining whether a running status corresponding to the device is healthy or not according to the health degree grade; and determining, in a case that the running status is not healthy, an attenuation interval where the maintenance component and the key and important component are located correspondingly according to the maintenance feature health degree and the key feature health degree, so as to take corresponding management strategies for the maintenance component or the key and important component according to the attenuation interval.

The device operation management method based on the device health degree provided by the present application can bring the following beneficial effects:

for the maintenance component and the key and important component with different attenuation characteristics, the corresponding maintenance feature health degree and key feature health degree are determined respectively, by proposing health degree evaluation assistance dimensions facing the key and important component and the maintenance component, multiple monitoring requirements are met, and the accuracy of evaluation results is effectively improved. The device health degree is evaluated globally in combination with the maintenance feature health degree and the key feature health degree, and the evaluation results may reflect an overall health state of the device, which is more convenient for device repairing and management.

BRIEF DESCRIPTION OF THE DRAWINGS

The accompanying drawings illustrated herein are intended to provide a further understanding of the present application, and form a part of the present application, and schematic embodiments of the present application and their illustration are used to explain the present application, but do not constitute an appropriate limitation to the present application. In the accompanying drawings.

DETAILED DESCRIPTION OF THE EMBODIMENTS

In order to make the objects, technical solutions and advantages of the present application clearer, the technical solutions of the present application will be clearly and completely described below in conjunction with specific embodiments of the present application and corresponding accompanying drawings. Apparently, the described embodiments are only part of the embodiments of the present application, not all of the embodiments. Based on the embodiments in the present application, all other embodiments obtained by those ordinarily skilled in the art without making creative work belong to the protection scope of the present application.

Figure 1:
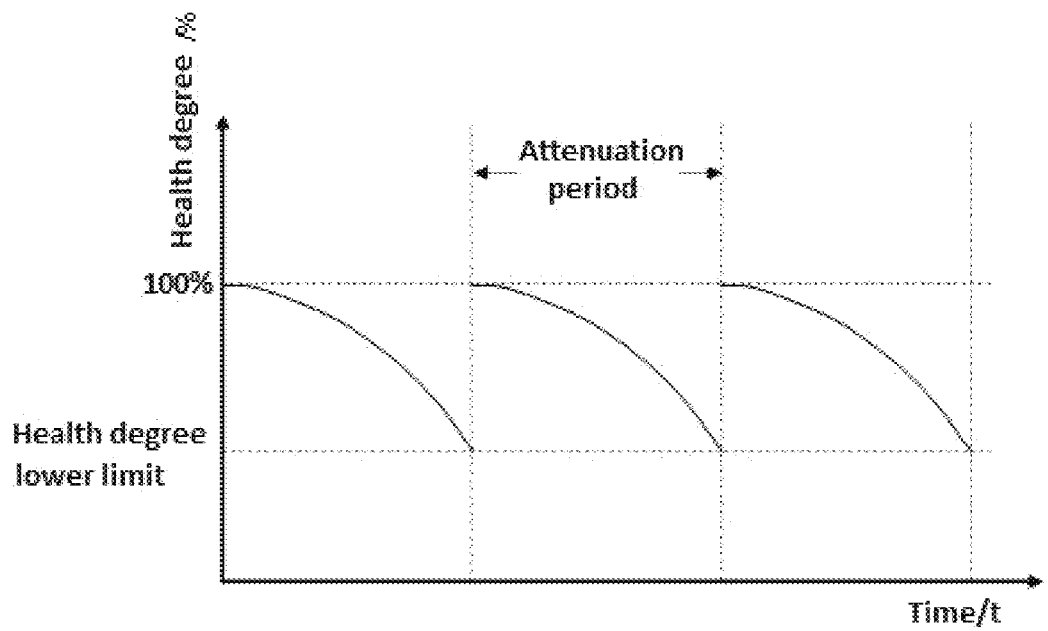
FIG. 1 is a schematic diagram of a maintenance component performance attenuation characteristic curve provided by an embodiment of the present application.
Figure 2:
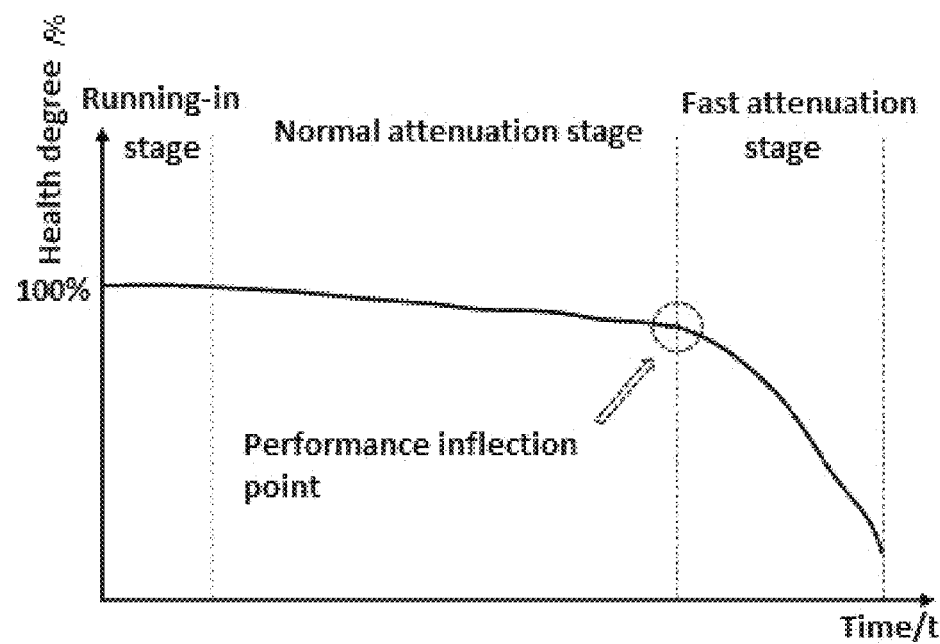
FIG. 2 is a schematic diagram of a key and important component performance attenuation characteristic curve provided by an embodiment of the present application.

A device health degree is an evaluation indicator for representing a device health monitoring result. The device health degree essentially depends on degrees of health of components of a device, while during the service life of the device, performance attenuation characteristics corresponding to different components are also different, and according to the difference between the performance attenuation characteristics, an embodiment of the present application divides the device components into two types: a maintenance component and a key and important component. The maintenance component refers to a component which is fast in performance attenuation, requires periodic maintenance and is restorable in performance after maintenance, its performance attenuation characteristic is as shown in FIG. 1, within one attenuation period, a health degree of the component is gradually decreased until a health degree lower limit, and at the moment, the component may be repaired to restore its original performance. The key and important component is a collective term for a key component and an important component, and refers to a component which is slow in performance attenuation but cannot directly restore performance in a short period through repairing, its performance attenuation characteristic is as shown in FIG. 2, the key and important component has three performance attenuation stages, namely a running-in stage, a normal attenuation stage, and a fast attenuation stage respectively, in the running-in stage, the health degree of the key and important component is basically kept stable, in the normal attenuation stage, the health degree of the key and important component is attenuated at a normal speed until reaching a performance inflection point, and then enters into the fast attenuation stage, and then the health degree of the key and important component presents a fast decreasing trend.

Therefore, the maintenance component has the characteristic that the performance may be restored through periodic maintenance, which is manifested by a certain periodic feature of the health degree, while the key and important component is different from the maintenance component, its health degree does not have an attenuation period, and a conventional health degree evaluation method does not take into account the attenuation characteristic difference between the maintenance component and the key and important component. The characteristics of short period and fast attenuation of the health degree of the maintenance component usually cover up the characteristics of long life cycle and slow attenuation of the key and important component, such that tiny early failures of the key and important component are hard to monitor. If only the performance attenuation of the key and important component is considered while the performance attenuation of the maintenance component is not considered, there will be a case that the maintenance component has reached the performance limit but an overall health degree of a device is still in an excellent or good state, a device user is prone to being not able to maintain the maintenance component, thus causing device failures and losses. However, if health degrees of components are only evaluated independently, instead of comprehensively analyzing the device health degree, an overall health state of the device cannot be mastered.

Therefore, in the embodiment of the present application, on the basis of distinguishing the performance attenuation characteristic difference between the maintenance component and the key and important component, multi-dimensional evaluation on a device health degree, a key feature health degree and a maintenance feature health degree of the device is performed, thereby meeting a multi-dimensional monitoring requirement proposed by users.

The technical solutions provided by the embodiments of the present application are described in detail below in combination with the accompanying drawings.

Figure 3:
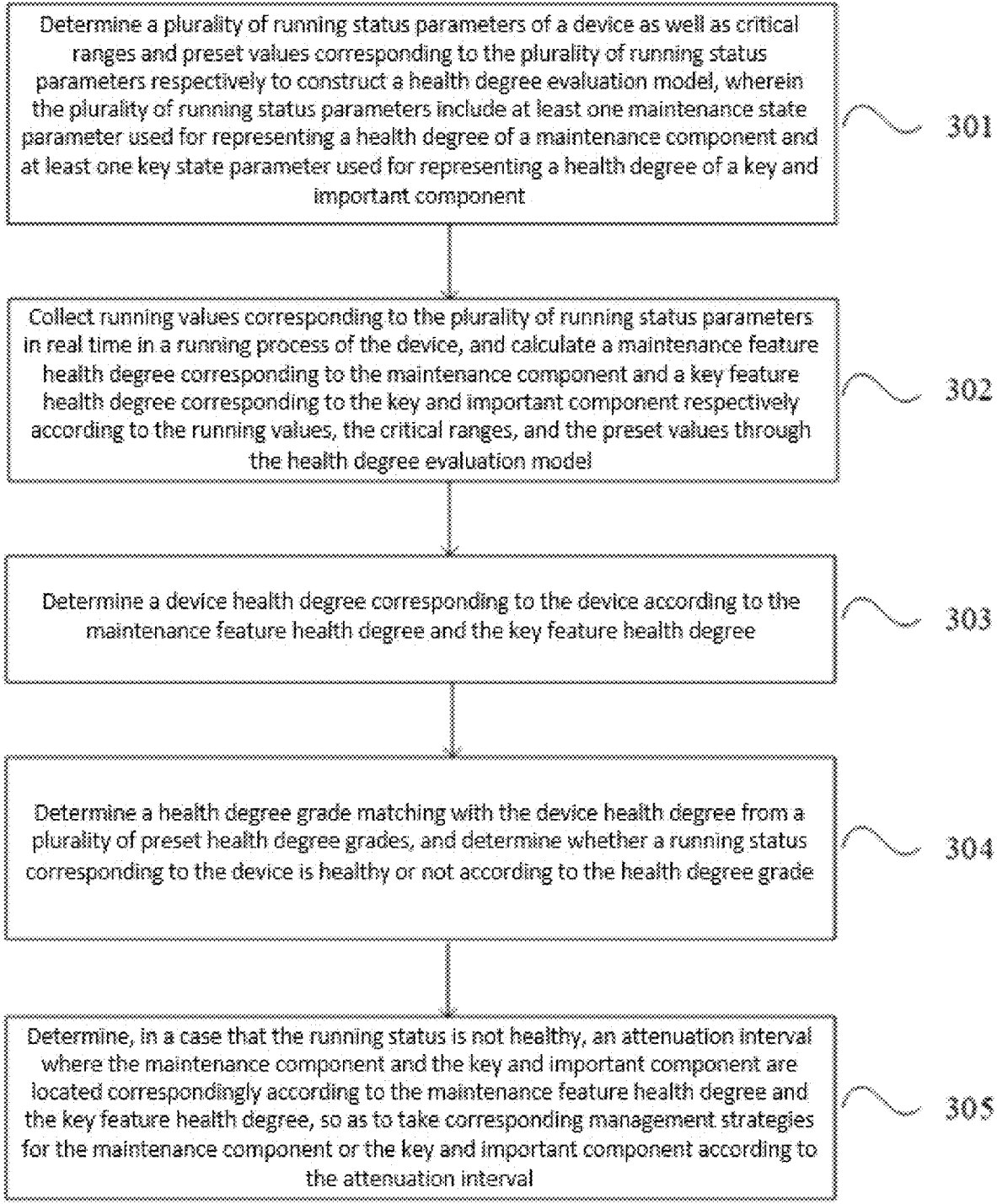
FIG. 3 is a schematic flow diagram of a device operation management method based on a device health degree provided by an embodiment of the present application.

As shown in FIG. 3, a device operation management method based on a device health degree provided by an embodiment of the present application includes:

301: a plurality of running status parameters of a device as well as critical ranges and preset values corresponding to the plurality of running status parameters respectively are determined to construct a health degree evaluation model, wherein the plurality of running status parameters include at least one maintenance state parameter used for representing a health degree of a maintenance component and at least one key state parameter used for representing a health degree of a key and important component.

For one device, the plurality of running status parameters used for guaranteeing the device health degree of the device may be determined by comprehensively analyzing running status parameters related to device failures and running status parameters related to the quality of products produced by the device. The plurality of running status parameters include at least one maintenance state parameter used for representing the performance of the maintenance component and at least one key state parameter used for representing the performance of the key and important component. The maintenance state parameter is used for evaluating the health degree of the device maintenance component, and the key is monitoring a maintenance period and performing maintenance in time to restore the performance. The key state parameter is used for evaluating the health degree of a device key component, and the key is monitoring a performance inflection point of the key component and performing overhaul or re-manufacturing in time before reaching the performance inflection point such that part or all of the performance of the key and important component is restored. The device health degree can be determined as a whole by comprehensively evaluating the maintenance state parameter and the key state parameter.

For example, for an inverter welding machine, abnormal current, voltage, wire feeding speed, and gas pressure are often related to device failures. At the same time, the current, voltage, wire feeding speed, and gas pressure are also key factors that affect the welding quality (for example, the current affects a welding depth, the voltage affects a welding width, the wire feeding speed affects a metal melting state, and the gas pressure affects the quantity of pores, etc.). The health degree of the welding machine may be evaluated through the above four running status parameters. The gas pressure is a maintenance running status parameter, with the consumption of gas, performance attenuation of a maintenance component is fast, and the performance of the maintenance component may be restored after replacing a gas cylinder regularly or inflating a gas tank. The current, voltage, and wire feeding speed come from a key and important component, its performance attenuation is slow, its state needs to be monitored, and overhaul or re-manufacturing is performed in time before a performance inflection point is reached, such that part or all of the performance of the key and important component is restored.

The critical ranges and preset values of the running status parameters may be determined by performing failure characteristic analysis on the device, and then the health degree evaluation model is constructed according to the above critical ranges and preset values. The health degree evaluation model can evaluate the health degree of the maintenance component and the health degree of the key and important component of the device respectively, when running values corresponding to the running status parameters are within the critical ranges, the device health degree may be evaluated by determining deviation degrees between the running values and the preset values, and when the running values of the running status parameters exceed the critical ranges, it may be directly determined that the device is not healthy, and the health degree is recorded as a specified value 0.

302: the running values corresponding to the plurality of running status parameters are collected in real time in a running process of the device, and a maintenance feature health degree corresponding to the maintenance component and a key feature health degree corresponding to the key and important component are calculated respectively according to the running values, the critical ranges, and the preset values through the health degree evaluation model.

In the running process of the device, the running values corresponding to the plurality of running status parameters may be collected in real time through a data collection device. For example, running values corresponding to the four running status parameters of the current, the voltage, the wire feeding speed, and the gas pressure are collected. After the running values corresponding to the plurality of running status parameters are obtained, the maintenance feature health degree corresponding to the maintenance component and the key feature health degree corresponding to the key and important component may be calculated respectively according to the running values, the critical ranges, and the preset values through the pre-constructed health degree evaluation model.

Specifically, for each running status parameter, a critical lower limit value and a critical upper limit value in the corresponding critical range are determined, and the corresponding running value is compared with the critical range and the corresponding preset value respectively to determine a range of the running value. The range includes a first range, a second range, and a third range, wherein the first range denotes that the running value is greater than the critical lower limit value and less than the preset value, the second range denotes that the running value is greater than the preset value and less than the critical upper limit value, and the third range denotes that the running value exceeds the critical range.

Further, after the range of the running value is determined, the health degrees corresponding to the maintenance component and the key and important component respectively may be determined through the health degree evaluation model. When the running value is within the first range, the maintenance feature health degree corresponding to the maintenance component and the key feature health degree corresponding to the key and important component may be determined respectively according to the running value, the preset value, and the critical lower limit value. That is, the maintenance feature health degree corresponding to the maintenance component and the key feature health degree corresponding to the key and important component are obtained by solving a quotient of a first difference value obtained by subtraction of the running value and the critical lower limit value and a second difference value obtained by subtraction of the preset value and the critical lower limit value. When the running value is within the second range, the maintenance feature health degree corresponding to the maintenance component and the key feature health degree corresponding to the key and important component may be determined respectively according to the running value, the preset value, and the critical lower limit value. That is, the maintenance feature health degree corresponding to the maintenance component and the key feature health degree corresponding to the key and important component are obtained by solving a quotient of a third difference value obtained by subtraction of the critical upper limit value and the running value and a fourth difference value obtained by subtraction of the critical upper limit value and the preset value. When the running value is within the third range, it shows that the running status parameter of the current device is obviously abnormal and the device is in an unhealthy state, and at the moment, the maintenance feature health degree corresponding to the maintenance component and the key feature health degree corresponding to the key and important component are directly recorded as a specified value 0.

303: a device health degree corresponding to the device is determined according to the maintenance feature health degree and the key feature health degree.

Through the maintenance feature health degree and the key feature health degree obtained in the above content, the performance of the maintenance component and the key and important component may be monitored in real time during operation of the device, and then a corresponding repairing strategy is made. However, the maintenance feature health degree and the key feature health degree are only evaluation results obtained after health degree evaluation is performed on the maintenance component and the key and important component, and cannot reflect an overall health state of the device, and therefore, if operation management is to be performed on the device globally, the device health degree further needs to be evaluated globally in combination with the maintenance feature health degree and the key feature health degree.

Since the different running status parameters have different impact degrees on the performance attenuation of the device and when the device is in different working condition intervals, the impact degrees of the running status parameters are also different correspondingly, for example, for a welding machine, when it is in a working condition of welding, the voltage and the current are main factors of guaranteeing smooth cutting, and their impact degrees are higher than those of the wire feeding speed and the gas pressure, feature weights corresponding to the plurality of running status parameters respectively need to be determined according to a working condition interval where the device is located. The feature weights include a first feature weight corresponding to the maintenance state parameter and a second feature weight corresponding to the key state parameter. It should be noted that, the first and second are only intended to indicate the different types of running status parameters, rather than limiting the quantity of the key state parameters. After the first feature weight and the second feature weight are determined, weighted summation is performed on the maintenance feature health degree and the key feature health degree according to the first feature weight and the second feature weight to obtain the device health degree corresponding to the device. For example, a first feature weight corresponding to a maintenance state parameter, namely gas pressure, is $\lambda_1$, second feature weights corresponding to key state parameters, namely a current, a voltage and a wire feeding speed, respectively are $\lambda_2$, $\lambda_3$, and $\lambda_4$, weighted summation is performed on the maintenance feature health degree $\mu_1(t)$ and the key feature health degrees $\mu_2(t)$, $\mu_3(t)$, and $\mu_4(t)$ through the first feature weight and the second feature weights, and the device health degree of the device may be obtained, specifically as shown in the following formula: $\mu(t)=\mu_1(t)\times\lambda_1+\mu_2(t)\times\lambda_2+\mu_3(t)\times\lambda_3+\mu_4(t)\times\lambda_4$.

The above feature weights directly determined according to the working condition interval are fixed values, however, when a certain running status parameter exceeds an early warning value, it is possible that a health degree obtained after operation is still in a normal state because a feature weight allocated to the running status parameter originally is small, which makes the device submerged abnormally, and lowers the accuracy of the analysis results. Therefore, for the running status parameter exceeding the early warning value, the embodiment of the present application will increase its impact degree on the device, and the first feature weight and the second feature weight need to be compensated adaptively.

Specifically, a running value corresponding to each running status parameter is compared with the early warning value to determine running status corresponding to the maintenance state parameter and the key state parameter respectively. The running status include a normal state and an abnormal state. Compensation manners correspond to the running status, and are divided into two types of positive compensation and negative compensation. It is to be understood that, the feature weight corresponding to the running status parameter in the abnormal state shall be somewhat increased, and needs positive compensation, while a sum of the first feature weight and the second feature weight needs to satisfy a preset weight balance value, such as 1, so that after the above feature weight corresponding to the running status parameter in the abnormal state is increased, the feature weight corresponding to the running status parameter in the normal state shall be decreased correspondingly so as to make the two maintain overall balance. As such, after the running status corresponding to the maintenance state parameter and the key state parameter are determined, a positive compensation coefficient of the abnormal state and a negative compensation coefficient corresponding to the normal state are determined respectively, and then the first feature weight and the second feature weight are compensated according to the positive compensation coefficient or the negative compensation coefficient to obtain a compensated first feature weight and a compensated second feature weight.

The compensation coefficient may be obtained through the following process: determining a first weight sum of feature weights corresponding to the running status parameters in the abnormal state and a second weight sum of features corresponding to the running status parameters in the abnormal state. The positive compensation coefficient of the abnormal state is determined according to the first weight sum, the preset weight balance value, and the first feature weight, and the negative compensation coefficient of the normal state is determined according to the second weight sum, the weight balance value and the second feature weight.

Specifically, the compensated first feature weight and the compensated second feature weight may be obtained through the following formulas:

$$\lambda_m = \lambda_{m0} + \left(1 - \sum_{i \in K_1} \lambda_i\right)\lambda_{m0}$$

$$\lambda_n = \lambda_{n0} - \left(1 - \sum_{i \in K_2} \lambda_i\right)\lambda_{n0}$$

In the formulas, $\lambda_m$ and $\lambda_n$ denote the compensated first feature weight and the compensated second feature weight respectively, $\lambda_{m0}$ and $\lambda_{n0}$ denote an initial first feature weight and an initial second feature weight respectively, $K_1$ denotes a sequential value set of the running status parameters in the abnormal state, $K_2$ denotes a sequential value set of the running status parameters in the normal state, and $\lambda_i$ denotes the $i^{th}$ feature weight.

By compensating the first feature weight and the second feature weight, abnormal submerging caused by unreasonable feature weights can be effectively avoided, and thus the accuracy of the analysis results can be effectively improved.

304: a health degree grade matching with the device health degree is determined from a plurality of preset health degree grades, and whether a running status corresponding to the device is healthy or not is determined according to the health degree grade.

After being obtained, the device health degree needs to match with the plurality of preset health degree grades, so that the health degree grade matching with the current device health degree is determined from the above plurality of health degree grades. The health degree grade is used for representing a health state of a device, whether the running status corresponding to the device is healthy or not can be determined according to the health degree grade, and thus the device is managed by adopting corresponding treatment measures accordingly to avoid failures or abnormalities of the device.

S305: in a case that the running status is not healthy, an attenuation interval where the maintenance component and the key and important component are located is determined correspondingly according to the maintenance feature health degree and the key feature health degree, so as to take corresponding management strategies for the maintenance component or the key and important component according to the attenuation interval.

In one embodiment, health state grades are divided into a first grade, a second grade, and a third grade in sequence according to the decreasing order of the device health degree. If the health degree grade of the device is the first grade, it shows that the health state of the device is excellent, and no repairing is required. If the health degree grade of the device is the second grade, it shows that the health state of the device is good, and the device is suitable for long-time operation and does not need to be repaired within a short period. If the health degree grade of the device is the third grade, it shows that the device has abnormal performance and is not suitable for long-time operation, and the attenuation interval where the key and important component and the maintenance component are located needs to be determined correspondingly according to the key feature health degree and the maintenance feature health degree, so that corresponding management strategies (e.g., strategies of maintenance, repairing or overhaul) are taken for the maintenance component or the key and important component according to the attenuation interval.

Specifically, it can be seen from FIG. 1 and FIG. 2 that, the maintenance component presents periodic attenuation, while the key and important component has different attenuation speeds within different performance attenuation stages, and therefore a maintenance attenuation interval where the maintenance component is located and a key attenuation interval where the key and important component is located may be determined correspondingly according to the maintenance feature health degree and the key feature health degree. It should be noted that, the attenuation interval and the performance attenuation stage have different meanings, the attenuation interval corresponds to the maintenance feature health degree or the key feature health degree in continuous segments, and may be understood as an interval formed by ordinates in a performance attenuation characteristic curve, while the performance attenuation stage corresponds to a continuous time period, and may be understood as an interval formed by abscissas, and all maintenance feature health degrees within the maintenance attenuation interval are not lower than a preset health degree lower limit value.

After the maintenance attenuation interval is determined, an attenuation period corresponding to the maintenance attenuation interval may be determined according to abscissa values corresponding to a performance attenuation curve within the maintenance attenuation interval, and then the maintenance component is periodically maintained according to the attenuation period, so that the maintenance feature health degree corresponding to the maintenance component can be restored to an original state in time. For the key and important component, a key attenuation interval where the key and important component is located may be determined according to the key feature health degree. The attenuation interval includes a running-in interval, a normal attenuation interval, and a fast attenuation interval, and a key and important component performance inflection point exists between the normal attenuation interval and the fast attenuation interval. As such, the corresponding management strategies (e.g., overhaul or re-manufacturing) are taken for the key and important component when the key feature health degree does not reach the key and important component performance inflection point, so that part or all of the performance of the key and important component can be restored.

The above is a method embodiment provided by the present application. Based on the same idea, some embodiments of the present application further provide a system corresponding to the above method and a non-volatile computer storage medium.

Figure 4:
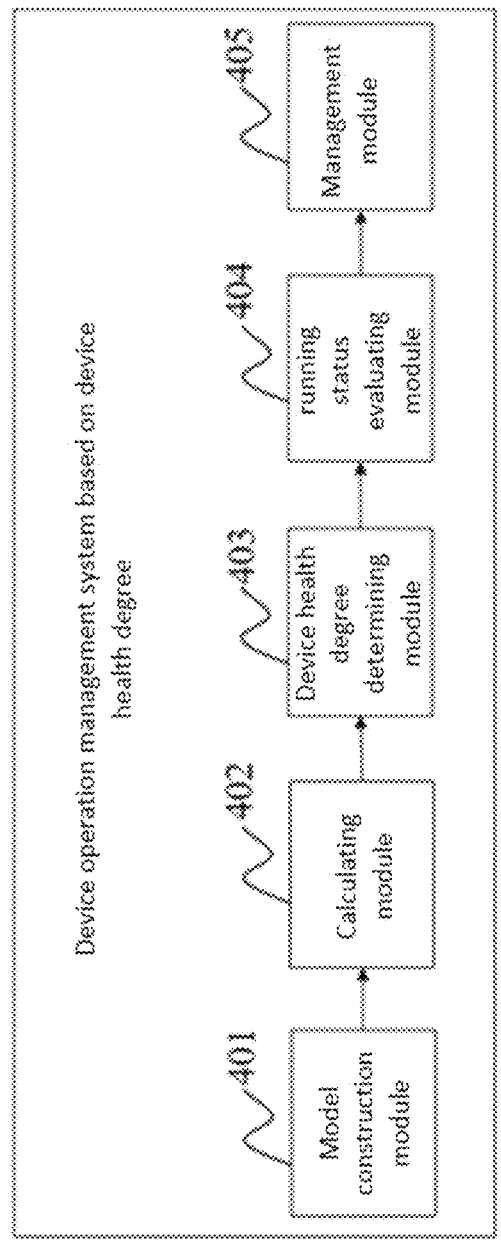
FIG. 4 is a schematic architecture diagram of a device operation management system based on a device health degree provided by an embodiment of the present application.

FIG. 4 is a schematic architecture diagram of a device operation management system based on a device health degree provided by an embodiment of the present application. As shown in FIG. 4, the system includes:

- a model construction module 401, configured to determine a plurality of running status parameters of a device as well as critical ranges and preset values corresponding to the plurality of running status parameters respectively to construct a health degree evaluation model, wherein the plurality of running status parameters include at least one maintenance state parameter used for representing a health degree of a maintenance component and at least one key state parameter used for representing a health degree of a key and important component;
- a calculating module 402, configured to collect running values corresponding to the plurality of running status parameters in real time in a running process of the device, and calculate a maintenance feature health degree corresponding to the maintenance component and a key feature health degree corresponding to the key and important component respectively according to the running values, the critical ranges and the preset values through the health degree evaluation model;
- a device health degree determining module 403, configured to determine a device health degree corresponding to the device according to the maintenance feature health degree and the key feature health degree;
- a running status evaluating module 404, configured to determine a health degree grade matching with the device health degree from a plurality of preset health degree grades, and determine whether a running status corresponding to the device is healthy or not according to the health degree grade; and
- a management module 405, configured to determine, in a case that the running status is not healthy, an attenuation interval where the maintenance component and the key and important component are located correspondingly according to the maintenance feature health degree and the key feature health degree, so as to take corresponding management strategies for the maintenance component or the key and important component according to the attenuation interval.

The non-volatile computer storage medium provided by the embodiment of the present application stores computer-executable instructions, and the computer-executable instructions are set for:

- determining a plurality of running status parameters of a device as well as critical ranges and preset values corresponding to the plurality of running status parameters respectively to construct a health degree evaluation model, wherein the plurality of running status parameters include at least one maintenance state parameter used for representing a health degree of a maintenance component and at least one key state parameter used for representing a health degree of a key and important component;
- collecting running values corresponding to the plurality of running status parameters in real time in a running process of the device, and calculating a maintenance feature health degree corresponding to the maintenance component, and a key feature health degree corresponding to the key and important component respectively according to the running values, the critical ranges, and the preset values through the health degree evaluation model;
- determining a device health degree corresponding to the device according to the maintenance feature health degree and the key feature health degree;
- determining a health degree grade matching with the device health degree from a plurality of preset health degree grades, and determining whether a running status corresponding to the device is healthy or not according to the health degree grade; and
- determining, in a case that the running status is not healthy, an attenuation interval where the maintenance component and the key and important component are located correspondingly according to the maintenance feature health degree and the key feature health degree, so as to take corresponding management strategies for the maintenance component or the key and important component according to the attenuation interval.

The various embodiments in the present application are all described in a progressive manner, and the same or similar parts between the various embodiments can be referred to each other. Each embodiment focuses on contents different from other embodiments. In particular, as for the device and medium embodiments, as they are basically similar to the method embodiment, the description is relatively simple. As for related parts, please refer to part of the description in the method embodiment.

The device and medium provided by the embodiments of the present application correspond one-to-one to the method, and therefore, the device and medium also have the beneficial technical effects similar to their corresponding method. As the beneficial technical effects of the method have been described in detail above, the beneficial technical effects of the device and medium will not be repeated here.

Those skilled in the art will appreciate that the embodiments of the present application may be provided as methods, systems, or computer program products. Therefore, the present application may take the form of a full hardware embodiment, a full software embodiment, or an embodiment combining software and hardware. Besides, the present application may adopt the form of a computer program product implemented on one or more computer available storage media (including but not limited to a disk memory, a CD-ROM, an optical memory and the like) containing computer available program codes.

The present application is described with reference to the flow diagram and/or block diagram of the method, device (system), and computer program product according to the embodiments of the present application. It should be understood that each flow and/or block in the flow diagram and/or block diagram and the combination of flows and/or blocks in the flow diagram and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow diagram and/or one or more blocks of the block diagram.

These computer program instructions can also be stored in a computer-readable memory capable of guiding a computer or other programmable data processing devices to work in a specific manner, so that instructions stored in the computer-readable memory generate a manufacturing product including an instruction apparatus, and the instruction apparatus implements the functions specified in one or more flows of the flow diagram and/or one or more blocks of the block diagram.

These computer program instructions can also be loaded on a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow diagram and/or one or more blocks of the block diagram.

In a typical configuration, a computing device includes one or more processors (CPU), an input/output interface, a network interface, and a memory.

The memory may include a volatile memory, a random access memory (RAM) and/or a non-volatile memory, and other forms in a computer readable medium, such as a read-only memory (ROM) or a flash RAM. The memory is an example of the computer readable medium.

The computer readable medium includes permanent and non-permanent, and removable and non-removable media, and may achieve information storage through any method or technology. The information may be computer-readable instructions, data structures, modules of programs, or other data. Examples of the computer storage medium include, but not limited to, a phase-change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical storage and magnetic cassette tape, magnetic-tape magnetic-disk storage or other magnetic storage devices or any other non-transmission media, and may be used to store information that can be accessed by a computing device. According to the definition herein, the computer readable medium does not include transitory media, such as modulated data signals and carriers.

It should further be noted that, the terms "include", "comprise" or any other variants thereof are intended to cover non-exclusive inclusion, so that a process, method, article or device including a series of elements not only includes those elements, but also includes other elements not clearly listed, or also includes elements inherent to this process, method, article or device. Without further restrictions, the elements defined by the sentence "including a . . . " do not exclude that there are other same elements in the process, method, article or device including the elements.

The above is merely the embodiments of the present application and are not intended to limit the present application. For those skilled in the art, the present application may have various modifications and changes. Any modifications, equivalent replacements, improvements, etc. made within the spirit and principle of the present application shall fall within the scope of the claims of the present application.

What is claimed is:

1. A device operation management method based on a device health degree, comprising:
    determining, by a processor, a plurality of running status parameters of a device as well as critical ranges and preset values corresponding to the plurality of running status parameters respectively to construct a health degree evaluation model, wherein the plurality of running status parameters comprise at least one maintenance state parameter used for representing a health degree of a maintenance component and at least one key state parameter used for representing a health degree of a key and important component;
    collecting running values corresponding to the plurality of running status parameters in real time in a running process of the device, wherein the plurality of running status parameters includes a gas pressure, and calculating, by the processor, a maintenance feature health degree corresponding to the maintenance component and a key feature health degree corresponding to the key and important component respectively according to the running values, the critical ranges, and the preset values through the health degree evaluation model;
    determining, by the processor, the device health degree corresponding to the device according to the maintenance feature health degree and the key feature health degree;
    determining, by the processor, a health degree grade matching with the device health degree from a plurality of preset health degree grades, and determining whether a running status corresponding to the device is healthy or not according to the health degree grade; and
    determining, by the processor, when the running status is not healthy, an attenuation interval where the maintenance component and the key and important component are located correspondingly according to the maintenance feature health degree and the key feature health degree, so as to take corresponding management strategies for the maintenance component or the key and important component according to the attenuation interval, wherein the attenuation interval is an interval formed by ordinates in a performance attenuation characteristic curve; and
    repairing at least one of the maintenance component or the key and important component based on the attenuation interval, wherein the repairing comprises replacing at least one of the maintenance component or the key and important component;
    wherein the step of calculating the maintenance feature health degree corresponding to the maintenance component and the key feature health degree corresponding to the key and important component respectively according to the running values, the critical ranges, and the preset values through a preset health degree evaluation model comprises:
        determining a critical lower limit value and a critical upper limit value in each critical range, and comparing the running values with the critical ranges and the preset values respectively to determine a range of the running values, wherein the range comprises a first range, a second range, and a third range, the first range denotes that the running values are greater than critical lower limit values and less than the preset values, the second range denotes that the running values are greater than the preset values and less than critical upper limit values, and the third range denotes that the running values exceed the critical ranges;
        determining, when the range is the first range, the maintenance feature health degree corresponding to the maintenance component and the key feature health degree corresponding to the key and important component respectively according to the running values, the preset values, and the critical lower limit values through the health degree evaluation model;

determining, when the range is the second range, the maintenance feature health degree corresponding to the maintenance component and the key feature health degree corresponding to the key and important component respectively according to the running values, the preset values, and the critical upper limit values; and determining, when the range is the third range, that the maintenance feature health degree corresponding to the maintenance component and the key feature health degree corresponding to the key and important component are both specified values; and wherein the step of determining the attenuation interval where the maintenance component and the key and important component are located correspondingly according to the maintenance feature health degree and the key feature health degree, so as to take the corresponding management strategies for the maintenance component or the key and important component according to the attenuation interval comprises:

determining, according to the maintenance feature health degree, a maintenance attenuation interval and an attenuation period corresponding to the maintenance attenuation interval, wherein the maintenance component is located in the maintenance attenuation interval, and all maintenance feature health degrees within the maintenance attenuation interval are higher than or equal to a preset health degree lower limit value;

maintaining the maintenance component periodically according to the attenuation period;

determining a key attenuation interval according to the key feature health degree, wherein the key and important component is located in the key attenuation interval, the key attenuation interval comprises a running-in interval, a normal attenuation interval, and a fast attenuation interval, and a key and important component performance inflection point exists between the normal attenuation interval and the fast attenuation interval, wherein the key attenuation interval is at least twice as long as the attenuation period of the maintenance component such that the maintenance component is repaired at least twice before the key and important component is repaired during said repairing, wherein the repairing of the maintenance component comprises replacing a gas cylinder or inflating a gas tank; and taking the corresponding management strategies for the key and important component when the key feature health degree does not reach the key and important component performance inflection point.

2. The device operation management method based on the device health degree according to claim 1, wherein the step of determining the device health degree corresponding to the device according to the maintenance feature health degree and the key feature health degree comprises:

determining a working condition interval, wherein the device is located in the working condition interval, and determining feature weights corresponding to the plurality of running status parameters respectively according to the working condition interval, wherein the feature weights comprise a first feature weight corresponding to the at least one maintenance state parameter and a second feature weight corresponding to the at least one key state parameter; and performing weighted summation on the at least one maintenance feature health degree and the at least one key feature health degree according to the first feature weight and the second feature weight to obtain the device health degree corresponding to the device.

3. The device operation management method based on the device health degree according to claim 2, wherein prior to performing the weighted summation on the at least one maintenance feature health degree and the at least one key feature health degree according to the first feature weight and the second feature weight, the device operation management method further comprises:

comparing a running value corresponding to each running status parameter with an early warning value corresponding to the each running status parameter to determine the running status corresponding to the maintenance state parameter and the key state parameter respectively, wherein the running status comprise a normal state and an abnormal state; and determining a positive compensation coefficient of the abnormal state and a negative compensation coefficient corresponding to the normal state respectively, and compensating the first feature weight and the second feature weight according to the positive compensation coefficient or the negative compensation coefficient to obtain a compensated first feature weight and a compensated second feature weight.

4. The device operation management method based on the device health degree according to claim 3, wherein the step of determining the positive compensation coefficient of the abnormal state and the negative compensation coefficient corresponding to the normal state respectively comprises:

determining a first weight sum of feature weights corresponding to the plurality of running status parameters in the abnormal state and a second weight sum of features corresponding to the plurality of running status parameters in the abnormal state; and determining the positive compensation coefficient of the abnormal state according to the first weight sum, a preset weight balance value, and the first feature weight, and determining the negative compensation coefficient of the normal state according to the second weight sum, the preset weight balance value, and the second feature weight.

5. The device operation management method based on the device health degree according to claim 3, wherein a sum of the first feature weight and the second feature weight is a weight balance value.

6. The device operation management method based on the device health degree according to claim 1, wherein the step of determining the maintenance feature health degree corresponding to the maintenance component and the key feature health degree corresponding to the key and important component respectively according to the running values, the preset values, and the critical lower limit values comprises:

for the plurality of running status parameters, obtaining the maintenance feature health degree corresponding to the maintenance component and the key feature health degree corresponding to the key and important component by solving a quotient of a first difference value obtained by subtraction of the running values and the critical lower limit values and a second difference value obtained by subtraction of the preset values and the critical lower limit values; and the step of determining the maintenance feature health degree corresponding to the maintenance component and the key feature health degree corresponding to the key and important component respectively according to the running values, the preset values, and the critical upper limit values comprises:

for the plurality of running status parameters, obtaining the maintenance feature health degree corresponding to the maintenance component and the key feature health degree corresponding to the key and important component by solving a quotient of a third difference value obtained by subtraction of the critical upper limit values and the running values and a fourth difference value obtained by subtraction of the critical upper limit values and the preset values.

7. The device operation management method based on the device health degree according to claim 1, wherein the device is a welding machine.

* * * * *